United States Patent
Shaw

(10) Patent No.: US 6,406,003 B1
(45) Date of Patent: Jun. 18, 2002

(54) BARBED WIRE FENCE BRACE AND GATE HANGER AND METHOD THEREFOR

(76) Inventor: Joe N. Shaw, Rte. 1, Box 377, Hearne, TX (US) 77859

( * ) Notice: Subject to any disclaimer, the term of this patent is extended or adjusted under 35 U.S.C. 154(b) by 0 days.

(21) Appl. No.: 09/426,388

(22) Filed: Oct. 25, 1999

Related U.S. Application Data

(60) Provisional application No. 60/105,676, filed on Oct. 26, 1998.

(51) Int. Cl.$^7$ .............................................. E04H 17/02
(52) U.S. Cl. .............................. 256/36; 256/65; 256/73; 403/270; 403/336
(58) Field of Search ............................ 411/147; 256/65, 256/73, 67, 68, 69, 59, 32, 35, 2, 6, 30, 31, 36, 63, 64; 403/270, 271, 344, 336, 337, 338

(56) References Cited

U.S. PATENT DOCUMENTS

| | | | |
|---|---|---|---|
| 269,845 A | | 1/1883 | Fox |
| 303,729 A | | 8/1884 | Hanika |
| 619,684 A | | 2/1899 | Emerton et al. |
| 895,297 A | * | 8/1908 | Peter ............................ 256/55 |
| 3,833,201 A | | 9/1974 | Dill |
| 4,160,542 A | | 7/1979 | Winters |
| 4,257,465 A | * | 3/1981 | Berg ........................... 411/147 |
| 4,526,348 A | | 7/1985 | Cammack |
| 4,679,772 A | * | 7/1987 | Peterson ....................... 256/36 |
| 4,763,879 A | | 8/1988 | Wasicek et al. |
| 4,889,322 A | * | 12/1989 | Wagner ........................ 256/36 |
| 4,979,724 A | * | 12/1990 | Williams ....................... 256/36 |
| 5,192,055 A | | 3/1993 | Griggs et al. |
| 5,215,290 A | | 6/1993 | Khalessi |
| 5,575,580 A | * | 11/1996 | Parrish et al. ................. 256/65 |
| 5,593,143 A | | 1/1997 | Ferrarin |
| 5,785,447 A | * | 7/1998 | Fonti et al. .................... 256/65 |
| 5,795,503 A | | 8/1998 | Krake |

OTHER PUBLICATIONS

Piping Technology & Products, Inc., *Pipe Supports Catalog*, Two–Bolt Pipe Clamp, 1 sheet, Houston, Texas.

* cited by examiner

*Primary Examiner*—Lynne H. Browne
*Assistant Examiner*—Aaron Dunwoody
(74) *Attorney, Agent, or Firm*—Kenneth L. Nash

(57) ABSTRACT

A fence includes upright metal posts and a brace or rail clamped between the posts, where clamping the rail squares the posts with respect to the rail. The posts are anchored in the ground vertically, and the rail is installed horizontally, providing a rigid, H-shaped fence brace. Fence corners are provided by having at least three posts and two rails clamped together, although an additional post and rail can be used for added stability. Each rail preferably has a fixed, U-shaped clamp on each end, and a free, U-shaped clamp is bolted to the fixed clamp, the clamps encircling a fence post and squaring the fence post with respect to the rail. Gate hangers can be clamped to one of the posts to provide a gate post, where the gate hangers can be slid up or down or rotated about the post, providing flexibility for receiving and supporting a gate.

22 Claims, 5 Drawing Sheets

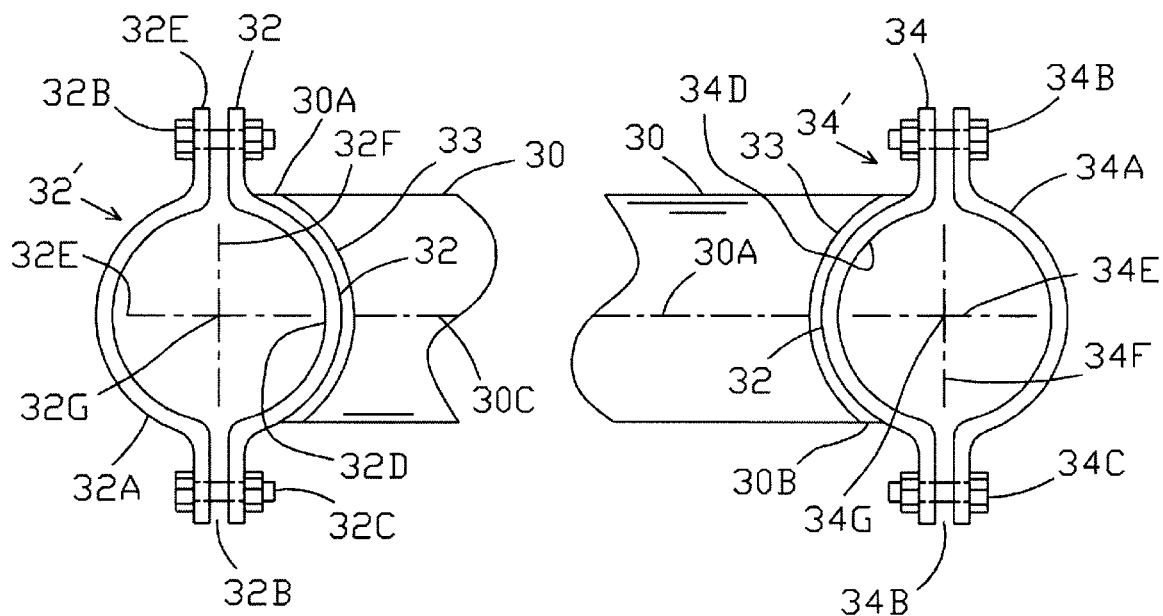
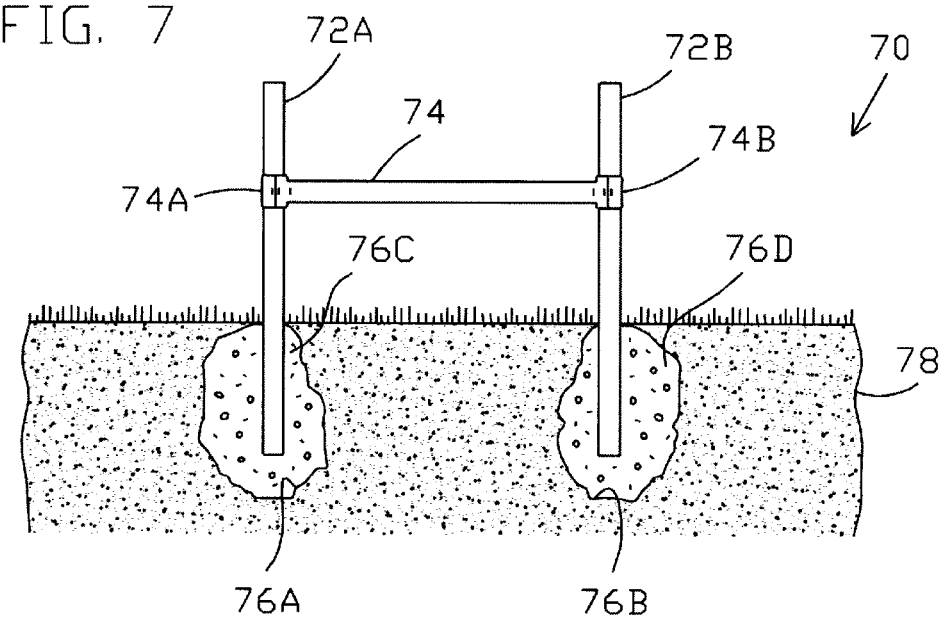

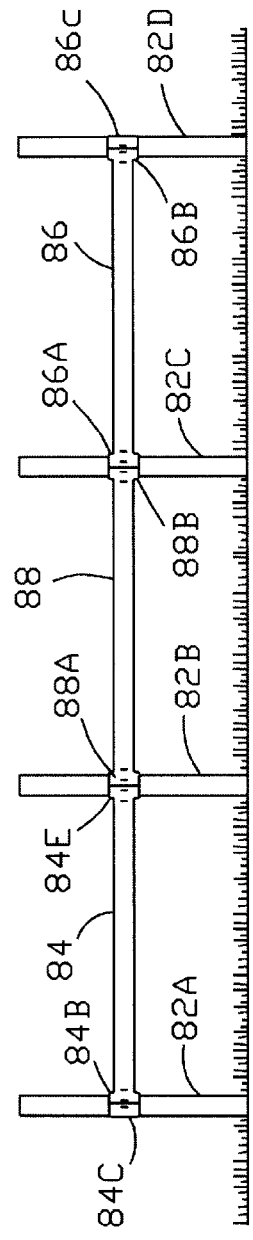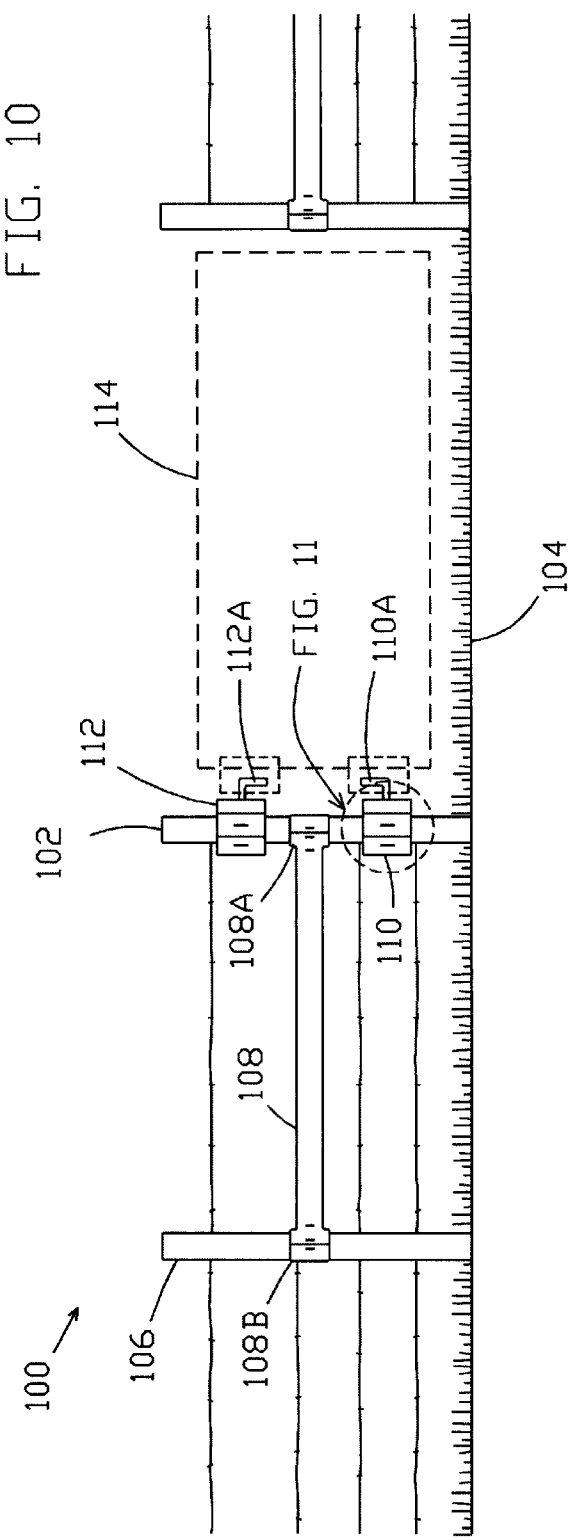

BARBED WIRE FENCE BRACE AND GATE HANGER AND METHOD THEREFOR

CROSS-REFERENCE TO RELATED APPLICATIONS

Priority is claimed to U.S. Provisional Patent Application No. 60/105,676, filed Oct. 26, 1998, which is hereby incorporated by reference.

STATEMENT REGARDING FEDERALLY SPONSORED RESEARCH

Not applicable.

BACKGROUND OF THE INVENTION

1. Field of the Invention

This invention pertains to fencing, and more particularly, to apparatus and methods for bracing a barbed wire fence and hanging a gate.

2. Description of the Related Art

Barbed wire fences are used on ranches and farms for containing livestock. Fence posts are set in the ground, and strands of barbed wire are attached to the posts. The posts have typically been wooden, and at a corner or gate, bracing has been used to keep the posts upright. For example, where wooden posts have been used, a brace or rail has been installed diagonally from the top of the corner or gate post to an adjacent post near the ground. The posts have been typically notched and the rail has been nailed into the post at the notch.

Fences are also made with a combination of wooden posts and metal posts, where the metal posts are used at corners and gates. For example, metal pipes are used as a corner or gate post and as an adjacent post. A rail is welded in place between the corner or gate post and its respective adjacent post. Wooden posts are used between corners and between a corner and a gate post.

Although this provides a very satisfactory barbed wire fence, it is inconvenient to weld on location wherever it is required to install corner or gate posts. Connectors for gate hinges have been welded to gate posts, or gate hinges have been welded directly to gate posts. In either case, it has been difficult to get the gate hinges in a proper location for receiving and supporting a gate. The location of the gate hinges cannot be adjusted, except by bending the gate hinge. Consequently, the gate is not installed properly, or the position of the gate post shifts over time, either of which can result in dragging of the gate, which is inconvenient. Further, it is not always possible to get a welder to a remote site where a fence is being built, and sparks from welding are a hazard for starting a fire.

SUMMARY OF THE INVENTION

An apparatus is provided for bracing a barbed wire fence at a corner, a gate post, in a long stretch of wire or elsewhere where a brace is needed for supporting the tension and weight of the barbed wire. First and second metal fence posts are provided for upright installation in the ground, and a rail is positioned between and clamped to the fence posts. Clamping the rail to the fence posts aligns the fence posts in parallel and rigid alignment. The rail is preferably installed such that the posts are squared with respect to the rail, forming an H-shaped structure. The rail preferably has a pipe clamp attached to each end.

A gate post can be provided similarly, where one of the metal posts is the gate post. Gate hangers are clamped to the gate post and can be positioned where desired by rotating about or sliding up or down on the fence post prior to clamping the gate hanger onto the fence post. Each gate hanger preferably includes a pipe clamp, which can be loosened after clamping for repositioning, and a gate hinge, which can be moved in and out for further adjustment.

In another aspect, a method is provided for bracing a barbed wire fence. A metal post for a corner or gate is anchored in the ground, and an adjacent metal post is anchored in the ground in alignment with a desired location for the barbed wire fence. Prior to the anchoring, a rail is preferably fixed between the metal posts such that the two posts are rigidly connected and held in a parallel configuration. The rail has a pipe clamp attached to each of its ends, and preferably, a rigid H-shaped brace is formed by clamping the rail to the posts.

BRIEF DESCRIPTION OF THE DRAWINGS

FIG. 3 is a top view of a brace or rail according to the present invention.

FIG. 7 is a side elevation of a fence brace according to the present invention.

FIGS. 8 and 9 are side elevation s of fence brace s according to the present invention.

FIG. 10 is a side elevation of a fence according to the present invention.

DETAILED DESCRIPTION OF INVENTION

Figure 1:
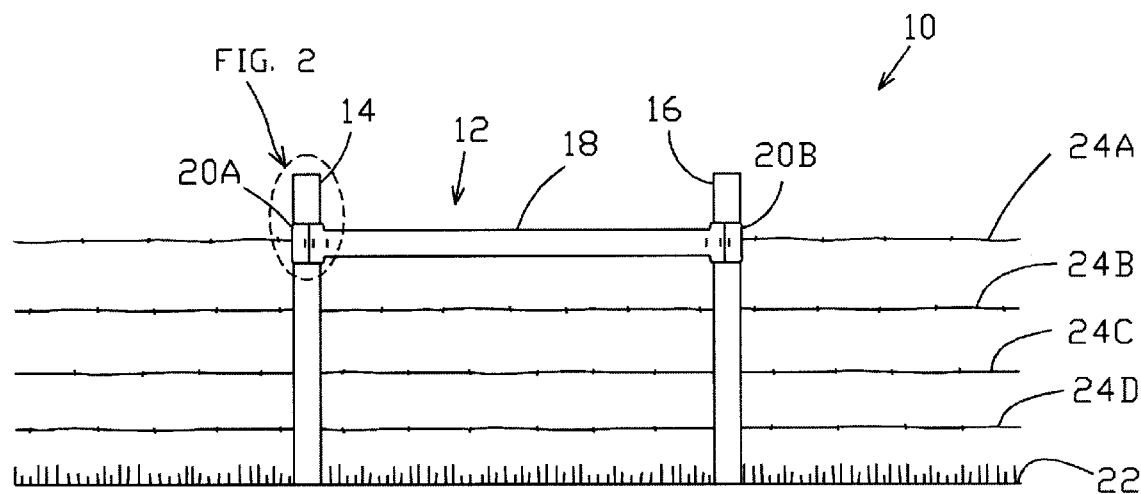
FIG. 1 is a side elevation of a barbed wire fence according to the present invention.

With reference to FIG. 1, a barbed wire fence 10 is illustrated according to the present invention. Barbed wire fence 10 has a fence brace 12, which includes fence posts 14 and 16. A brace or rail 18 is positioned between fence posts 14 and 16, holding the fence posts in rigid, parallel alignment. Rail 18 is clamped to posts 14 and 16 by pipe clamps 20a and 20b. Posts 14 and 16 are anchored in the ground 22, and strands of barbed wire 24a, 24b, 24c and 24d are attached to fence posts 14 and 16.

Fence brace 12 provides a rigid H-shaped structure, which supports one or more strands of barbed wire 24 (suffixes omitted). Fence brace 12 is particularly advantageous because pipe clamps 20a and 20b rigidly connect rail 18 to fence posts 14 and 16, forming 90 degree angles between each fence post and the rail.

Figure 2:
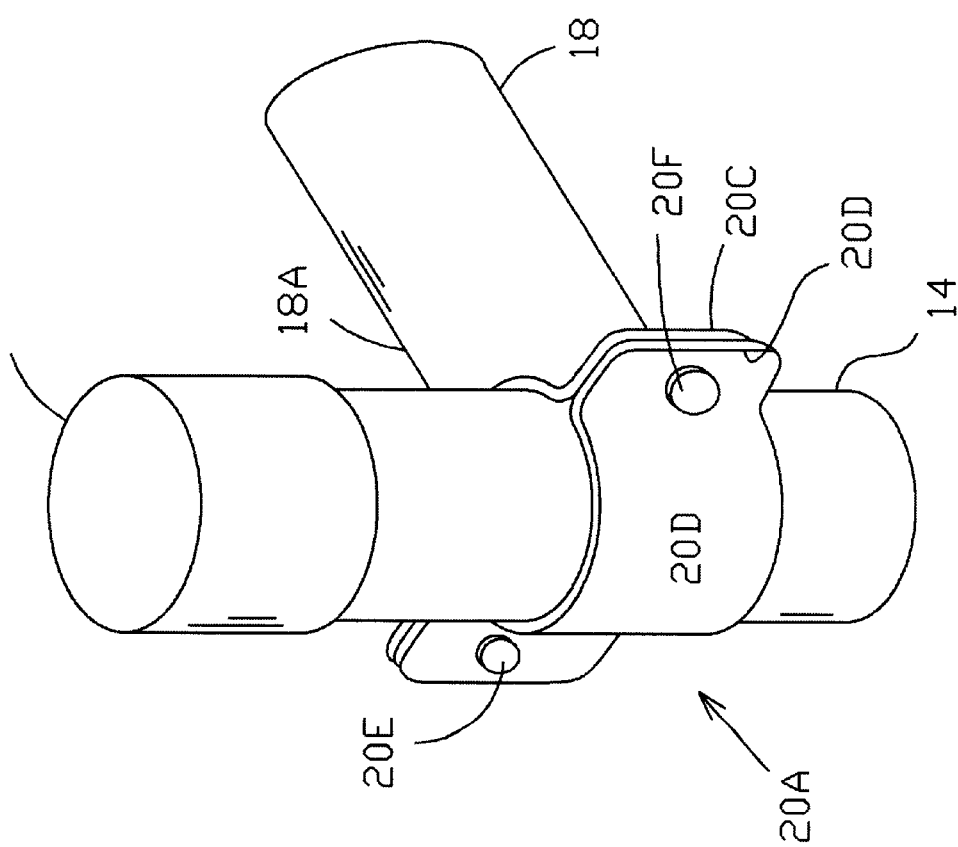
FIG. 2 is a perspective view of an enlargement of a portion of the fence of FIG. 1.

FIG. 2 is an enlargement of a portion of fence post 14 and rail 18, showing pipe clamp 20a in greater detail. Pipe clamp 20a includes a fixed, U-shaped clamp 20c, which is welded to an end 18a of rail 18. A free, U-shaped clamp 20d is a mirror image of fixed U-shaped clamp 20c. Bolts 20e and 20f fasten free clamp 20d to fixed clamp 20c. Fence post 14 has a cap 14a for keeping rain water from filling and rusting the inside of post 14, which is preferably a hollow pipe.

Fence posts 14 and 16 and rail 18 are preferably, but not necessarily, metal, cylindrical pipes. Fence posts 14 and 16 are preferably schedule 80 pipe, and scrap drill stem may be used to make the posts. Rail 18 is preferably schedule 40 pipe, and rail 18 and fence posts 14 and 16 preferably have a outsider diameter of 2⅞ ths inches. Rail 18 is preferably about 8 feet long.

Turning now to FIG. 3, a top view of a brace or rail 30 is illustrated. Rail 30 has ends 30a and 30b, which have a saddle cut for fixed U-shaped clamps 32 and 34. Clamps 32 and 34 are preferably welded to rail 30, but alternatively, clamps 32 and 34 can have a threaded connection, and rail 30 can have a threaded connection for threaded engagement between rail 30 and clamps 32 and 34.

A free, U-shaped clamp 32a is fastened to fixed, U-shaped clamp 32 using bolts 32b and 32c. Bolts 32b and 32c include a head, bolt shank and nut, as well as a lock washer, which is not shown. A free, U-shaped clamp 34a is similarly fastened to fixed, U-shaped clamp 34. Bolts 34b and 34c fasten free clamp 34a to fixed clamp 34.

Rail 30 has a longitudinal axis 30c, and fixed clamps 32 and 34 have semicylindrical surfaces 32d and 34d, respectively. Fixed clamp 32 and free clamp 32a and fixed clamp 34 and free clamp 34a have a longitudinal axis 32e and 34e. Pipe clamps 32' and 34' comprise the combination of fixed and free clamps 32 and 32a and 34 and 34a, respectively. Pipe clamps 32' and 34' each have a lateral axis 32f and 34f, respectively. Longitudinal axes 32e and 34e intersect lateral axes 32f and 34f at centerpoints 32g and 34g, respectively. Longitudinal axis 30c of rail 30 preferably intersects centerpoints 32g and 34g.

Longitudinal axes 32e and 34e are co-linear with longitudinal axis 30c of rail 30. Lateral axes 32f and 34f of pipe clamps 32' and 34', respectively, are perpendicular to longitudinal axis 30c of rail 30. Vertical planes passing through longitudinal axis 30c of rail 30 and lateral axes 32f and 34f of pipe clamps 32' and 34' are at right angles to each other or perpendicular.

Fixed U-shaped clamps 32 and 34 are preferably centrally mounted on the ends of rail 30. Semi-cylindrical surfaces 32d and 34d present concave surfaces on ends 30a and 30b, respectively, of rail 30. Each semi-cylindrical surface 32d and 34d preferably forms a Y-shape with longitudinal axis 30c of rail 30 such that each end of rail 30 has the shape of a Y, where longitudinal axis 30c forms the stem of the Y, and the U shape of the fixed clamp 32 or 34 forms the fork of the Y.

With this configuration, rail 30 and clamps 32' and 34' can be used to square fence posts with respect to rail 30. Pipe clamps 32' and 34' are sized to have an inside diameter that is slightly smaller than the outside diameter of posts on which it will be placed so that gaps 32h and 34h are formed. Gaps 32h and 34h are preferably about 3/32 inch in width. Clamps 32' and 34' have sufficient rigidity so that gaps 32h and 34h do not close when clamps 32' and 34' are clamped to fence posts.

Figure 4:
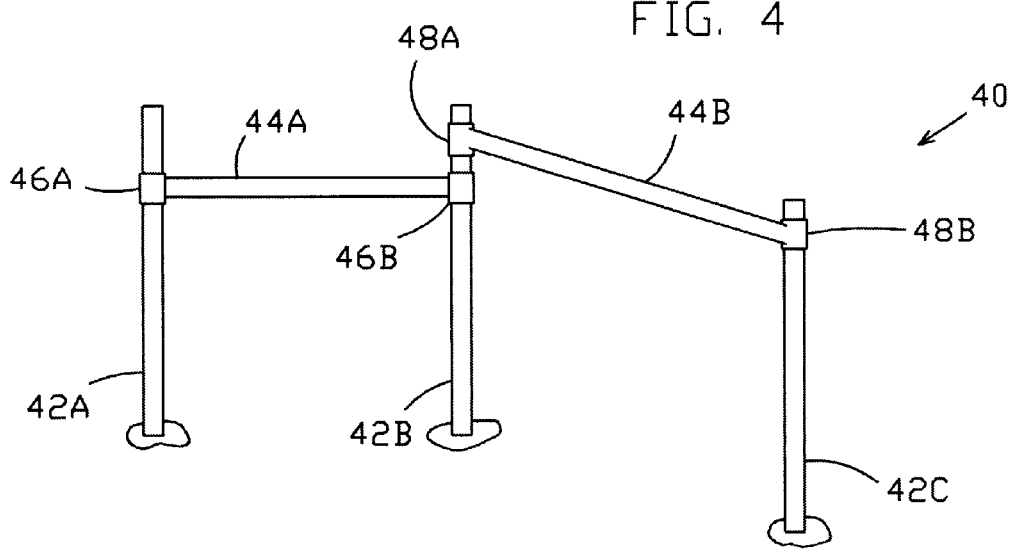
FIGS. 4 and 5 are perspective views of fence corners according to the present invention.

Turning now to FIG. 4, a fence corner 40 is illustrated. Fence corner 40 has three upright posts 42a, 42b and 42c. A rail 44a is connected between posts 42a and 42b, and a rail 44b is connected between posts 42b and 42c. Rail 44a is clamped to posts 42a and 42b by clamps 46a and 46b. Rail 44b is clamped between posts 42b and 42c by clamps 48a and 48b.

Any angle can be obtained in a corner such as illustrated by fence corner 40. Corners are typically at 90 degrees so that rail 44a is at a 90 degree angle with respect to rail 44b, but any angle can be obtained because clamps 46 and 48 (suffixes omitted) can rotate about post 42b. Thus, if posts 42a and 42b are in a desired position, but a different position is desired for post 42c, then post 42c can be placed where desired, and clamp 48a can be placed on post 42b at any desired angle or elevation. Posts 42a, 42b and 42c are preferably smooth-walled metal pipes, and clamps 46a, 46b, 48a, and 48b are preferably pipe clamps such as illustrated in FIGS. 2 and 3, so a clamp can be positioned at any desired location on its post.

The rail and clamps can slide up or down on the post, before fastening, or can rotate about the post. However, after bolts are tightened on the clamps, a rigid structure is formed, which cannot rotate, lean, slide or pivot. In FIG. 4, rail 44a clamps to posts 42a and 42b to form a rigid H-shaped structure. Additional rigidity is obtained from the combination assembly of the posts 42a, 42b and 42c and the rails 44a and 44b. Similarly, rail 44b clamps to posts 42b and 42c to form a rigid H-shaped structure. A fence stretcher can be placed on post 42b, and strands of barbed wire, or any other desired wire, can be stretched and fastened to post 42b. The wire is then fastened to either post 42a or 42c, depending on the direction of the wire. Posts 42a, 42b and 42c are anchored in the ground, providing an anchored structure for fence corner 40.

Figure 5:
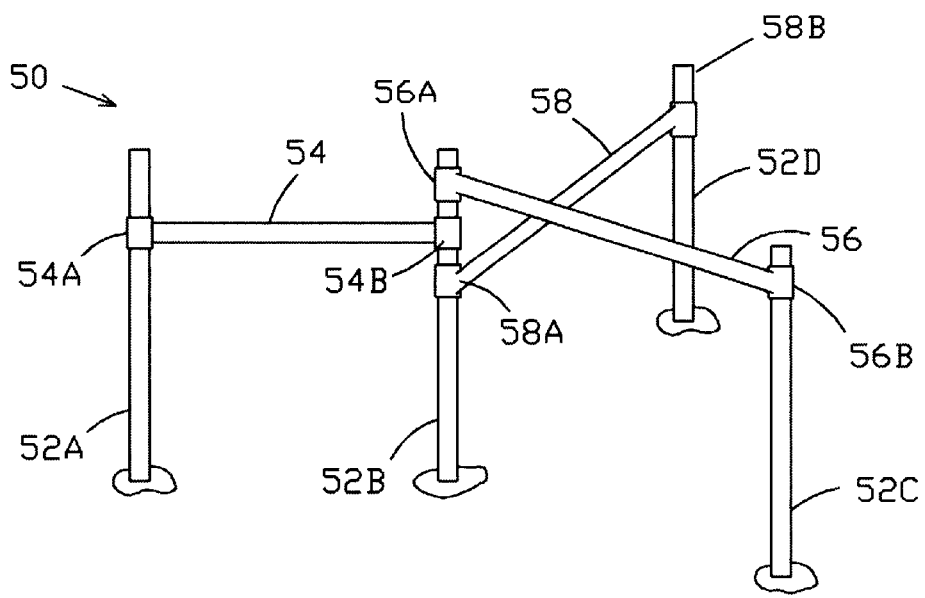

FIG. 5 illustrates additional bracing for a fence corner 50. Fence corner 50 has fence posts 52a, 52b, 52c and 52d. Rail 54 has clamps 54a and 54b, which clamp rail 54 between posts 52a and 52b, forming a rigid H-shaped structure. Rail 56 has clamps 56a and 56b, which clamp rail 56 between posts 52b and 52c. Rail 58 has clamps 58a and 58b, which clamp rail 58 between posts 52b and 52d, forming a rigid H-shaped structure.

Fence corner 50 is particularly useful where the soil is sandy, which does not anchor the fence posts firmly in the ground. By adding additional fence post 52d and rail 58, corner post 52b is additionally supported. One advantage of a fence corner according to the present invention is that the rails can be repositioned after complete assembly. This can be desirable where it is found that a rail interferes with the position of a strand of wire. In this case, the bolts fastening the clamp on the rail can be loosened while the posts are anchored in the ground and the rail can be slid up or down to reposition the rail so that it does not interfere with a strand of wire. This can be done even if wire has already been attached to the fence posts, because the rail is under a force and continues to provide a reactive force that holds its two posts apart in a rigid, parallel configuration. After the rail is repositioned, the bolts on the clamps can be re-tightened to form a rigid H-shaped structure.

Figure 6:
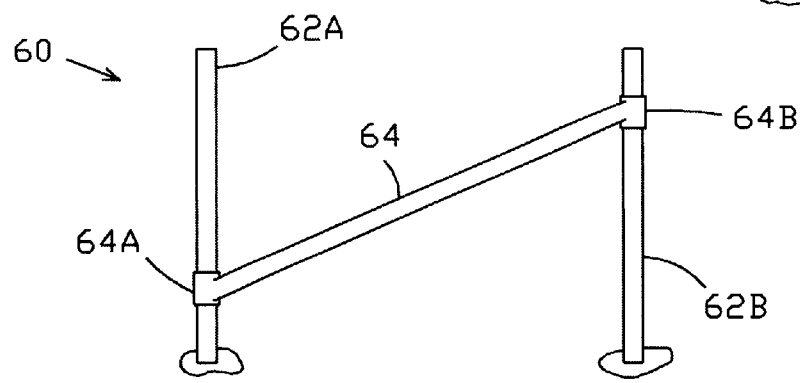
FIG. 6 is a side elevation of a fence brace according to the present invention.

FIG. 6 illustrates a fence brace 60 having fence posts 62a and 62b and a rail 64. Rail 64 has clamps 64a and 64b. Rail 64 is clamped to posts 62a and 62b using clamps 64a and 64b, which holds posts 62a and 62b in a rigid, parallel configuration. Fence brace 60 does not have an H-shaped structure because rail 64 is not square with respect to posts 62a and 62b. Rail 64 runs from a lower end of post 62a to an upper end of post 62b.

Wooden fences have typically been built with a fence brace having the appearance of fence brace 60. However, in the case of a wooden fence with a wooden rail, the points where the rail connects to the fence posts tend to be pivot points so that over time the fence leans.

With the present invention, on the other hand, the fence brace cannot lean because the rail and its clamps hold the fence posts in rigid, parallel alignment. The clamps have a sufficient length and are bolted to the fence post sufficiently tightly so that the connection between a rail and a fence post according to the present invention cannot be a pivot or hinge point.

With reference to FIG. 6, clamps 64a and 64b are preferably pipe clamps having an inside cylindrical surface that matingly engages the outside cylindrical surface of posts 62a and 62b respectively. Clamps 64a and 64b have a longitudinal axis as does rail 64. The longitudinal axis of rail 64 is not at a right angle with respect to the longitudinal axes of clamps 64a and 64b. Clamps 64a and 64b are welded to rail 64, and rail 64 holds posts 62a and 62b in parallel, preferably a vertical position, although rail 64 is not at a right angle with respect to post 62a or 62b, and rail 64 is preferably non-horizontal.

In an alternative embodiment, brace 64 of FIG. 6 has ends that are cut at an angle with respect to the longitudinal axis of rail 64. A flat plate having flanges and a hole in each flange is welded to the angled ends of rail 64. A free, U-shaped pipe clamp is bolted to the flat bar around the fence post. One of the free, U-shaped clamps, such as discussed with reference to FIGS. 2 or 3, can be used or a deeper clamp can be used to reduce the gap between the flat bar and the U-shaped clamp.

Turning now to FIG. 7, a fence brace 70 is illustrated and includes upright metal fence posts 72a and 72b. A rail 74 has clamps 74a and 74b for fastening rail 74 to fence posts 72a and 72b. Fence brace 70 can be installed by digging holes 76a and 76b in soil 78. In one method of installing fence brace 70, fence posts 72a and 72b are laid horizontally on soil 78 adjacent to holes 76a and 76b, respectively. Rail 74 is fastened to posts 72a and 72b using clamps 74a and 74b. Clamps 74a and 74b are of the type illustrated in FIGS. 2 and 3 and thus have bolts which are not shown in FIG. 7.

Upon fastening clamps 74a and 74b, which have a fixed end welded or otherwise attached to rail 74 and a free end that is bolted to the fixed portion of the clamp, a rigid H-shaped structure is formed. This structure can then be lifted and placed in holes 76a and 76b such that posts 72a and 72b are in a vertical position, and rail 74 is in a horizontal position. Posts 72a and 72b are cemented into a rigid position by adding concrete 76c and 76d, which anchors posts 72a and 72b firmly in the ground 78.

Alternatively, fence brace 70 can be made by digging holes 76a and 76b and standing posts 72a and 72b upright in the holes prior to clamping rail 74 to posts 72a and 72b. Concrete 76c can be added around post 72a in hole 76a, and concrete 76d can be added around post 72b in hole 76b. Prior to setting, concrete 76c and 76d is sufficiently viscous to hold posts 72a and 72b upright. Posts 72a and 72b can be positioned to a desired elevation and in a vertical position. Rail 74 can then be clamped to posts 72a and 72b by bolting clamp 74a together around post 72a and bolting clamp 74b together around post 72b. This is done before the concrete sets, and as clamps 74a and 74b are tightened, posts 72a and 72b are squared with respect to rail 74. Rail 74 and clamps 74a and 74b hold posts 72a and 72b in rigid, parallel alignment at a 90 degree angle with respect to rail 74. Concrete 76c and 76d then cures and sets, anchoring posts 72a and 72b firmly in the ground.

In another embodiment, metal fence posts are driven in the ground for anchoring the posts. A pile driver can be used, or a similar device can be used to drive the posts into the ground. A rail can then be clamped between the posts to align the posts in parallel and to maintain them that way.

In the prior art, metal posts have been anchored in the ground, and a welder has brought a welding machine to the location. A rail was then cut and welded between the posts. Although the resulting structure was satisfactory, the installation was inconvenient and expensive. On the other hand, a fence brace can be installed according to the present invention simply and easily, without need for a welder. With reference to FIG. 3, the fixed U-shaped clamp 32 is welded to rail 30 in a shop, where it is much easier to weld than in a field location.

Consequently, the quality of weld is better than typically achieved at a field location, and the alignment of fixed, U-shaped clamp 32 with rail 30 can be as desired within a close tolerance. Rail 30 has a saddle cut on end 30a, which receives an outside surface of fixed clamp 32, which is then welded to rail 30. Semi-cylindrical surface 32d is square with respect to a vertical plane passing through the longitudinal axis 30c of rail 30. Thus, when free clamp 32a is bolted to fixed clamp 32 so as to encompass a post, the post is squared with respect to the rail.

All that is needed to install fence brace 70 in FIG. 7 is a level to ensure that posts 72a and 72b are upright or plumb and to ensure rail 74 is level. The holes of course need to be dug, but only a wrench for tightening the bolts and a level for positioning the posts and rail are needed as far as hand tools. No welder or welding machine is required, which eliminates that cost and inconvenience as well as eliminating the risk of fire caused by sparks from welding.

FIG. 8 illustrates a fence brace 80 having four metal pipe fence posts 82a, 82b, 82c and 82d. A rail 84 is clamped between posts 82a and 82b, and rail 84 has fixed, U-shaped clamps 84a and 84b. A free, U-shaped clamp 84c is bolted to fixed clamp 84b for fastening rail 84 to post 82a. A rail 86 is fastened between posts 82c and 82d, and rail 86 has fixed, U-shaped clamps 86a and 86b. A free, U-shaped clamp 86c is bolted to fixed clamp 86b for fastening rail 86 to post 82d. A rail 88 is fastened between posts 82b and 82, and rail 88 has fixed, U-shaped clamps 88a and 88b. Fixed clamp 88a is a mirror image of fixed clamp 84a of rail 84 so that fixed clamp 84a bolts directly to fixed clamp 88a of rail 88 encompassing post 82b.

Similarly, fixed clamp 88b is a mirror image of fixed clamp 86a of rail 86 so that fixed clamp 88b bolts directly to fixed clamp 86a for fastening rails 88 and 86 to post 82c. In this manner, additional posts can be used for additional support where needed such as for a long stretch of wire.

Figure 9:
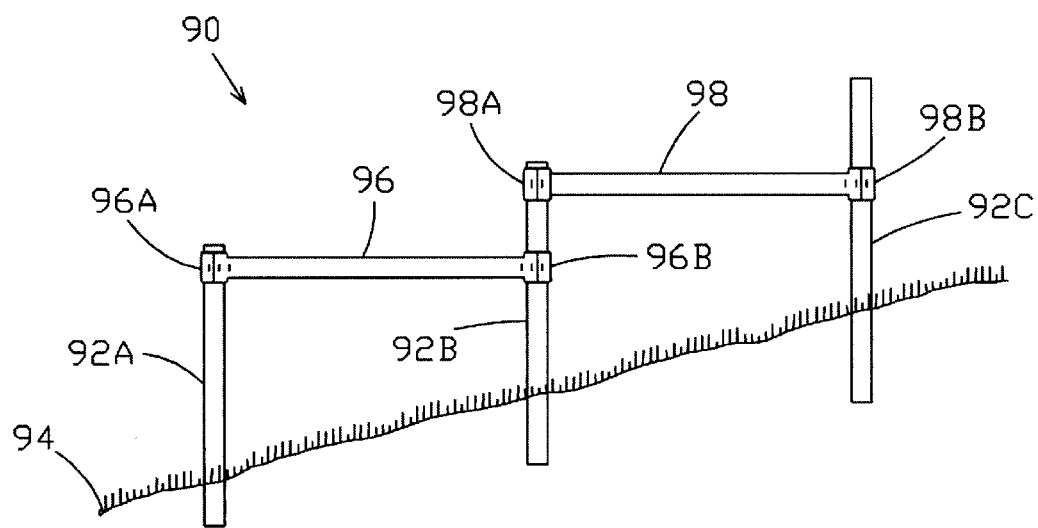

FIG. 9 illustrates a fence brace 90 according to the present invention. Fence brace 90 illustrates one of the advantages of a fence brace according to the present invention in which a fence must be installed over uneven terrain having hills, valleys, ravines, mounds and the like. Fence posts 92a, 92b and 92c are anchored in a sloped soil 94. A rail 96 having clamps 96a and 96b is installed between posts 92a and 92b. A rail 98 having clamps 98a and 98b is clamped between posts 92b and 92c.

Slope 94 is easily accommodated by installing rail 96 at an upper end of post 92a while installing it in a middle portion of post 92b so that rail 96 is horizontal. Clamping rail 96 to post 92a and 92b squares the posts with respect to the rail, maintaining posts 92a and 92b in parallel alignment. Since there is no designated portion of the outside surface of the fence post that must receive a clamp, the clamp can be positioned wherever desired. Further, a rail can be rotated with respect to a post, which adds a great deal of flexibility in its installation.

Turning now to FIG. 10, a fence 100 is illustrated according to the present invention. A gate post 102 is anchored in soil 104. A brace post 106 is anchored in soil 104, and a rail 108 is clamped to posts 102 and 106. Rail 108 has clamps 108a and 108b for clamping rail 108 to fence posts 102 and 106, respectively, as described with reference to FIG. 2.

A pair of gate hangers 110 and 112 support a gate 114, which is shown in phantom lines. Gate hangers 110 and 112 are clamped to gate post 102 and have L-shaped gate hinges or pins 110a and 112a, respectively, on which gate 114 is hinged. Gate hanger 110 is shown enlarged in FIG. 11. Gate hanger 110 is identical to gate hanger 112 except gate pin 112a is pointed downward while gate pin 110a is pointed upward, so that gate 114 cannot be lifted off of its hinges.

Figure 11:
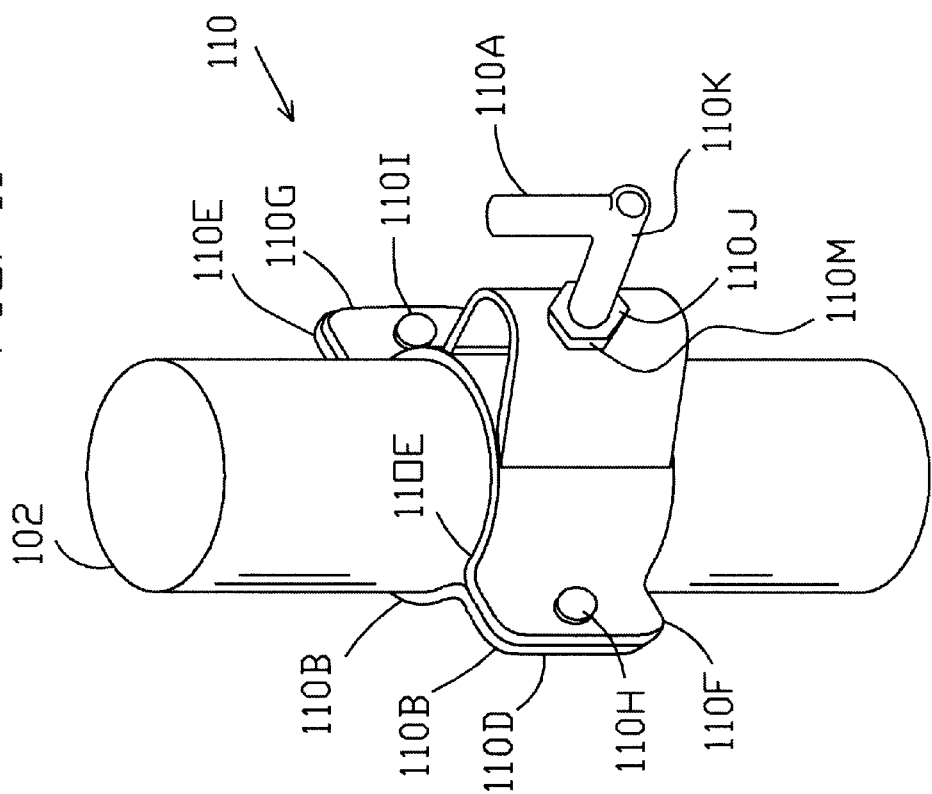
FIG. 11 is a perspective view of an enlargement of a portion of the fence of FIG. 10.

With reference to FIG. 11, gate hanger 110 includes a pair of U-shaped clamps 110b and 110c. Clamp 110b has flanges 110d and 110e, and clamp 110c has flanges 110f and 110g. Bolts 110h and 110i fasten clamps 110b and 110c together at the flanges. This tightly clamps gate hanger 110 to post 102.

Preferably, a U-shaped component 110j receives gate hinge or gate pin 110a. U-shaped component 110j ,has a hole for receiving gate hinge 110a and a nut is welded to the inside of component 110j, which is not shown. U-shaped component 110j can be made from flat plat by drilling the hole, welding the nut about the hole, bending the flat plate to form the U shape, and welding it to clamp 110c. Gate hinge 110a has a shank portion 110k, which is threaded for threaded engagement with the nut located on the inside surface of U-shaped component 110j. A lock nut 110m is threadedly engaged with shank 11 Ok for tightening gate pin 110a to component 110j. Thus, gate hinge 11 Oa can be moved in and out by threading and unthreading shank portion 110k in component 110j, which provides adjustment for gate 114, such as for leveling gate 114.

Gate post 102, brace post 106 and rail 108 of FIG. 10 are installed as described above with reference to FIG. 7. Gate hanger 110 is clamped to gate post 102 by bolting clamps 110b and 110c together. (FIG. 11) With reference to FIG. 10, gate 114 is placed on gate hinge or gate pin 110a. With gate 114 in a desired position, gate hanger 112 is installed by bolting U-shaped clamps 110b and 110c together as described above. Gate hangers 110 and 112 can be slid up and down on gate post 102 or rotated with respect to gate post 102, as well as with respect to each other.

Sliding the hangers up and down allows adjustment of the gate from the ground for clearance and spacing. Rotating one hanger with respect to the other allows one to adjust the gate to fall within a vertical plane. Gate hinges 110a and 112a can be threaded in or out for horizontal adjustment of gate 14, where a top edge of the gate is leveled. These various points of adjustment provide a great deal of flexibility in hanging gate 114.

In the prior art, gate hangers or gate hinges were installed in a fixed position with little flexibility for adjustment. Consequently, a gate would often drag the ground or otherwise operate somewhat improperly. For example, the upper gate pin may not fully engage the hinge on the gate. With a gate post and gate hangers according to the present invention on the other hand, the gate hangers can be positioned where desired and can be repositioned if necessary.

In summary, a fence according to the present invention has fence braces, corners and/or gate posts, which are fast and easy to assemble, yet strong and rigid. The fence brace is capable of withstanding a great deal of force from tension on wire and from the weight of the wire as well as from the weight of a gate suspended from a gate post. These fence braces are more economical than building metal fence braces in place using a welder and field-cut rails. Assembly is simple, requiring only a wrench and a level plus anchoring of the posts in the ground. Installation of a rail between posts pulls the posts to a 90 degree angle with respect to the rail. The posts are heavy-duty, metal posts, which last much longer than wooden posts.

Caps can be placed on the top of posts to prevent accumulation of water or moisture inside the post, and rails or braces can be placed at any desired height for both function and appearance. For example, multiple rails can be used at an entrance for an aesthetic appearance. Metal corners and pull posts are strong enough to last a lifetime or more, yet simple to construct. Welding is conducted in the controlled environment of a shop, and field assembly is as simple as bolting the U-shaped clamps together. A clamped post cannot pivot or rotate because the rail is firmly clamped to the post. The height of the clamp is typically, but not necessarily, greater than the diameter of the rail, providing a large surface area for engagement between the inside of the clamp and the outside of the post. Consequently, the posts cannot lean over, provided they are firmly anchored in the ground.

The metal posts may be anchored using concrete or driven into the ground using a pile driver or a suitable tool. Extra uprights and braces can be added for longer stretches, and extra braces or rails can be added for making a fence, such as a stock pen. In this manner, temporary fences can be constructed. Corners can be made having any desired angle, and side bracing can be added for extra strength and stability. For example, extra bracing can help support heavy gates or stabilize posts in sandy soils, which tend to allow the post to lean. Bracing can be provided on sloped surfaces, and extra bracing can be used to prevent movement of the posts on oddangled corners.

A gate post with gate hangers according to the present invention provides flexibility for proper placement of a gate. The gate hangers can be moved up or down or can be rotated to any desired position. The gate hinges can be moved in or out. Thus, the gate can be positioned a desired distance from the ground; it can be moved into preferably a vertical plane; and the gate can be preferably moved so that the top and/or bottom edge is level.

A U-shaped clamp has been illustrated as one embodiment of the present invention, but other clamps may be used that square the post with respect to the rail or brace. A U-shaped clamp has been described as attached to the center of the end of the rail, but the clamp could be attached to the side of the end of the rail. The foregoing disclosure and description of the invention are thus merely illustrative and explanatory thereof, and various changes in the details of the illustrated apparatus and construction and method of operation may be made without departing from the spirit of the invention.

What is claimed is:

1. A fence brace adapted for use in bracing a barbed wire fence, comprising:

a pair of metal fence posts for receiving barbed wire;

a rail demountably engaged with each post such that the posts are held rigidly in parallel alignment; and clamping means disposed at opposite ends of said rail for clamping with respect said pair of metal fence posts, said clamping means being slidable prior to being affixed along a length of each of said metal fence posts, said clamping means being securely affixable at any position along said length of each of said metal fence posts for rigidly supporting said rail with respect to said pair of metal fence posts;

a weld between each of said clamping means and said rail for permanently securing a portion of each of said clamping means to said rail; and said rail has a first end which defines a first saddle cut edge and a second end opposite to said first end defining a second saddle cut edge, a first clamp being welded to said first saddle cut edge and a second clamp being welded to said second saddle cut edge.

2. The fence brace of claim 1, wherein said clamping means comprises at one end of said rail a pair of U-shaped clamps, a pair of flanges extending radially outwardly from each of said U-shaped clamps such that said flanges protrude radially outwardly from an outer surface of U-shaped clamps, said pair of U-shaped clamps being connectable at said respective flanges with at least one connector extending through each flange, said pair of U-shaped clamps sized with respect to a diameter of each respective metal fence posts such that when rigidly secured to said metal fence post said pair of U-shaped clamps are spaced apart with respect to each other so as to be in a clearance position with respect to each other.

3. An apparatus adapted for bracing a barbed wire fence, comprising:
   first and second cylindrical vertical metal fence posts;
   the first rail having a fixed U-shaped clamp welded to each end, each welded clamp having a semi-cylindrical surface adapted for encompassing about half of the circumference of the circumference of one of the posts; and
   a free U-shaped clamp fastened by bolts to each fixed U-shaped clamp for clamping the first rail to the first and second posts, wherein tightening the bolts squares the first and second posts with respect to the first rail and forms a rigid H-shape; and
   a first pair of flanges extending radially outwardly from an outer surface of each fixed U-shaped clamp, a second pair of flanges extending radially outwardly from an outermost surface of said free U-shaped clamps, said bolts extending through first pair of outwardly extending flanges and said second pair of outwardly extending flanges.

4. The apparatus of claim 3, further comprising a pair of gate hinges clamped to the first post wherein each gate hinge comprises two U-shaped clamps, a threaded component attached to one of the clamps, and an L-shaped gate pin threadedly engaged with the threaded component.

5. An apparatus adapted for bracing a barbed wire fence, comprising:
   first and second cylindrical vertical metal fence posts;
   the first rail having a fixed U-shaped clamp welded to each end, each welded clamp having a semi-cylindrical surface adapted for encompassing about half of the circumference of the circumference of one of the posts; and
   a free U-shaped clamp fastened by bolts to each fixed U-shaped clamp for clamping the first rail to the first and second posts, wherein tightening the bolts squares the first and second posts with respect to the first rail and forms a rigid H-shape, said fixed U-shaped clamp and said free U-clamp on each end of said rail are spaced apart with respect to each other such that said fixed U-shaped clamp and said free U-shaped clamp are in a clearance position with respect to each other.

6. The apparatus of claim 5, wherein the bolts can be loosened and retightened for adjusting the height of the first rail with respect to a vertical length of said first and second posts, said bolts can be retightened to thereby rigidly support said rail at any position along said vertical length.

7. An apparatus adapted for bracing a barbed wire fence, comprising:
   first and second cylindrical vertical metal fence posts;
   the first rail having a fixed U-shaped clamp welded to each end, each welded clamp having a semi-cylindrical surface adapted for encompassing about half of the circumference of the circumference of one of the posts; and
   a free U-shaped clamp fastened by bolts to each fixed U-shaped clamp for clamping the first rail to the first and second posts, wherein tightening the bolts squares the first and second posts with respect to the first rail and forms a rigid H-shape; and
   a pair of gate hinges clamped to the first post, each of said gate hinges being slidable along a respective length of said first post.

8. An apparatus adapted for bracing a barbed wire fence, comprising:
   first and second cylindrical vertical metal fence posts;
   the first rail having a fixed U-shaped clamp welded to each end, each welded clamp having a semi-cylindrical surface adapted for encompassing about half of the circumference of the circumference of one of the posts; and
   a free U-shaped clamp fastened by bolts to each fixed U-shaped clamp for clamping the first rail to the first and second posts, wherein tightening the bolts squares the first and second posts with respect to the first rail and forms a rigid H-shape; and
   a third vertical metal fence post and a second rail clamped between the second post and the third post.

9. The apparatus of claim 8, wherein the second rail has a U-shaped clamp that serves as one of the free U-shaped clamps such that the U-shaped clamp on the second rail is bolted directly to one of the welded U-shaped clamps on the first rail such that the second post is encompassed by the U-shaped clamp on the second rail and this welded U-shaped clamp on the first rail.

10. A gate post for a barbed wire fence, comprising:
   a cylindrical, metal gate post;
   a metal, cylindrical brace post spaced apart from the gate post, the gate post and the brace post each being adapted to be anchored in the ground vertically, the gate post and brace each having a longitudinal axis;
   a rail demountably engaged with each post, the rail having a longitudinal axis;
   a fixed U-shaped clamp fixed to each end of the rail, each such clamp having a semi-cylindrical surface, each clamp being positioned such that the semi-cylindrical surface is intercepted at one point by the longitudinal axis of the rail;
   a free U-shaped clamp bolted with at least two bolts to each fixed U-shaped clamp such that one of the fence posts is encompassed by the combination of the free and fixed U-shaped clamps for clamping the rail to the fence posts;
   each combination of the free and fixed U-shaped clamps having a longitudinal axis that is co-axial with the longitudinal axis of th fence post onto which it is clamped, the longitudinal axis of the combination free and fixed U-shaped clamps being perpendicular to the longitudinal axis of the rail;
   the free U-shaped clamp being a mirror image of the fixed U-shaped clamp, the fixed clamp having opposing ends and a flange on each end, each flange having a hole for receiving a bolt, the flanges extending perpendicularly from the longitudinal axis of the rail;

a gate; and a pair of gate hangers clamped to the gate post for pivotally supporting said gate, each of the pair of gate hangers being slidable along a vertical length of said gate post and rotatable with respect to the gate post prior to clamping and removable after clamping whereby said pair of gate hangers may be affixed at any position along said vertical length of said gate post for permitting adjustment of a vertical height of said gate.

11. The gate post of claim 10, wherein said pair of gate hangers each comprise a first U-shaped gate hanger clamp and free U-shaped gate hanger clamp on each end of said rail are spaced apart with respect to each other such that [after said tightening] said first U-shaped gate hanger clamp and said free U-shaped gate hanger clamp are in a clearance position with respect to each other.

12. The gate post of claim 10, further comprising a threaded component attached to each of said gate hangers and an L-shaped gate pin threadedly engaged with the threaded component on each of said pair of gate hangers.

13. The gate post of claim 10, wherein the rail is a cylindrical pipe having an outside diameter and wherein the fixed and free U-shaped clamps have a length that is greater than the outside diameter of the rail.

14. A kit adapted for use with barbed wire and a plurality of fence posts, comprising:

a length of metal pipe;

a U-shaped clamp centrally mounted to each end of the pipe and presenting a concave surface on each end of the pipe, the clamp having opposing ends and a flange on each end, each flange having a hole for receiving a bolt; and at least two free U-shaped clamps that are the mirror image of the U-shaped clamps attached to the pipe wherein each fence post has an outside diameter, and wherein the combination of a free U-shaped clamp and a U-shape clamp attached to one end of the pipe forms an inside cylindrical surface having a diameter less than the diameter of the fence post so that the clamps can be fastened tightly to the fence posts so as to be in a clearance position with respect to each other.

15. The kit of claim 14, further comprising a pair of gate hanger clamps adapted to fasten onto the metal gate post and a pair of L-shaped gate hangers, wherein the gate hanger clamps have the size and shape of the clamps attached to the length of pipe, and wherein the L-shaped gate hinges are removably engageable with the gate hanger clamps.

16. The kit of claim 15, wherein each gate hanger clamp has an outside surface and a threaded component attached to the outside surface, and wherein each L-shaped gate hinge is threadably engaged with its respective gate hanger clamp at the threaded component.

17. The kit of claim 16, wherein the threaded component is a U-shaped plate welded to the outside surface of the gate hanger, the component having a pass-through hole and a nut welded to the component such that the L-shaped gate hinge engages the nut and passes through the pass-through hole.

18. The kit of claim 17, further comprising a lock nut threadedly engaged with each L-shaped gate hinge.

19. The kit of claim 15, further comprising at least two cylindrical metal fence posts, wherein the U-shaped clamps and the gate hanger clamps are adapted to fasten around the fence posts.

20. The kit of claim 19, where the two fence posts and a length of pipe are adapted to clamp together and form a rigid shape of an H.

21. The kit of claim 14, wherein each U-shaped clamp is attached to the end of the pipe by welding.

22. The kit of claim 21, further comprising at least four bolts, four nuts and four lock washers provided for the purpose of bolting each free U-shaped clamp to a respective U-shaped clamp attached to the pipe such that a fence post is encompassed by a free clamp in combination with one of the clamps attached to the pipe.

* * * * *